Oct. 1, 1957
M. F. WOODS
2,807,878
CONTOUR PROJECTING DEVICE
Filed March 8, 1957
2 Sheets-Sheet 1
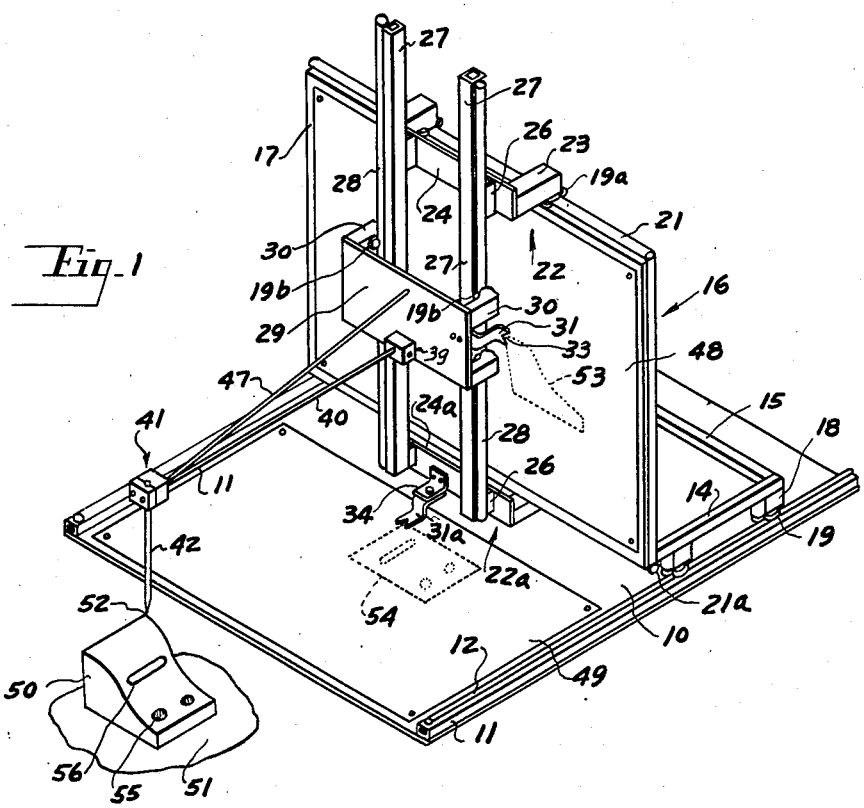
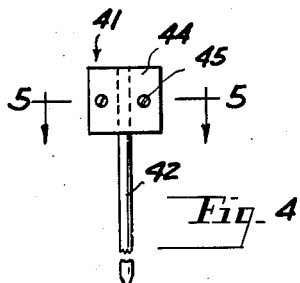
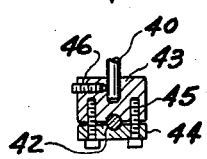
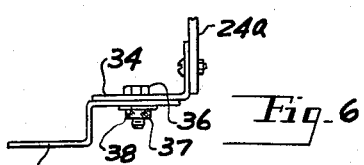
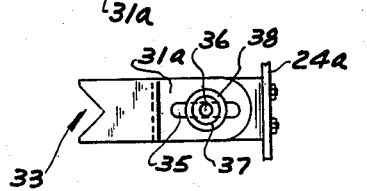
INVENTOR.
MICHAEL F. WOODS
BY Louis Chayka
ATTORNEY INVENTOR.
MICHAEL F. WOODS
BY
Louis Chayka
ATTORNEY United States Patent Office 2,807,878
Patented Oct. 1, 1957

2,807,878

CONTOUR PROJECTING DEVICE

Michael F. Woods, Detroit, Mich.

Application March 8, 1957, Serial No. 644,926

5 Claims. (Cl. 33—24)

The invention pertains to an apparatus for use in drafting projections of an object in plan elevation and in side elevation. More specifically, the apparatus is of a type which includes two rectangular drafting boards set at right angle to each other, namely, a horizontally-disposed board and a vertical one, the latter being mounted on rollers to permit the said board to be moved over the horizontal board in a direction parallel to two opposed sides of the horizontal board.

Associated with the vertical board is an assembly adapted to be moved transversely to the vertical board and including an element adapted to be adjusted vertically thereon and carrying a marking guide for use with the vertical board, and another marking guide for use with the horizontal board.

Associated with said assembly and mounted thereon for use outside the limits of the horizontal board is a probing element or pointer adapted to be brought in contact with the object of which the contours are to be projected. The pointer, when moved manually over the surface of the object, while in contact therewith, is adapted to guide movable elements which support the abovesaid marking guides for use with the two boards.

Because of this construction it is possible to secure on one of the boards, namely, the vertical one, a plurality of contours of an object in depth, that is, a series of consecutive projections of the profile or side elevation of the object, as the pointer is shifted consecutively from probing an object in one plane to parallel planes or a plane spaced therefrom.

At the same time that a side elevation is projected on the vertical board, it is possible to have a plan elevation of the object marked on the horizontal board.

Another important object to which the apparatus may be employed is to reverse the operative functions of the marking guides and to use them in conjunction with the projections as first made by means of the apparatus to guide the pointer. Thus, for instance, once the projections have been made from a given object, say a block with a plurality of apertures therein, a blank may be mounted in the location of the original object from which projections have been made, whereupon the pointer, moving in response to and with the movement of the marking guides on the two boards, will indicate where corresponding features, such as the holes in the block, are to be located.

These and other features will become obvious in the course of the following description of the apparatus illustrated in the accompanying drawings in which:

Fig. 1 is a perspective view of the apparatus, the view including an object of which projections are to be made by means of said apparatus;

Fig. 4 is an enlarged front elevational view of a surface-probing pointer forming a part of the apparatus;

Fig. 5 is a sectional view on line 5—5 of Fig. 4;

Fig. 6 is an enlarged side elevational view of a marking guide supported by a bracket;

Fig. 7 is a bottom view of said marking guide and the supporting bracket therefor.

Similar numerals refer to similar parts throughout the several views.

Figure 2:
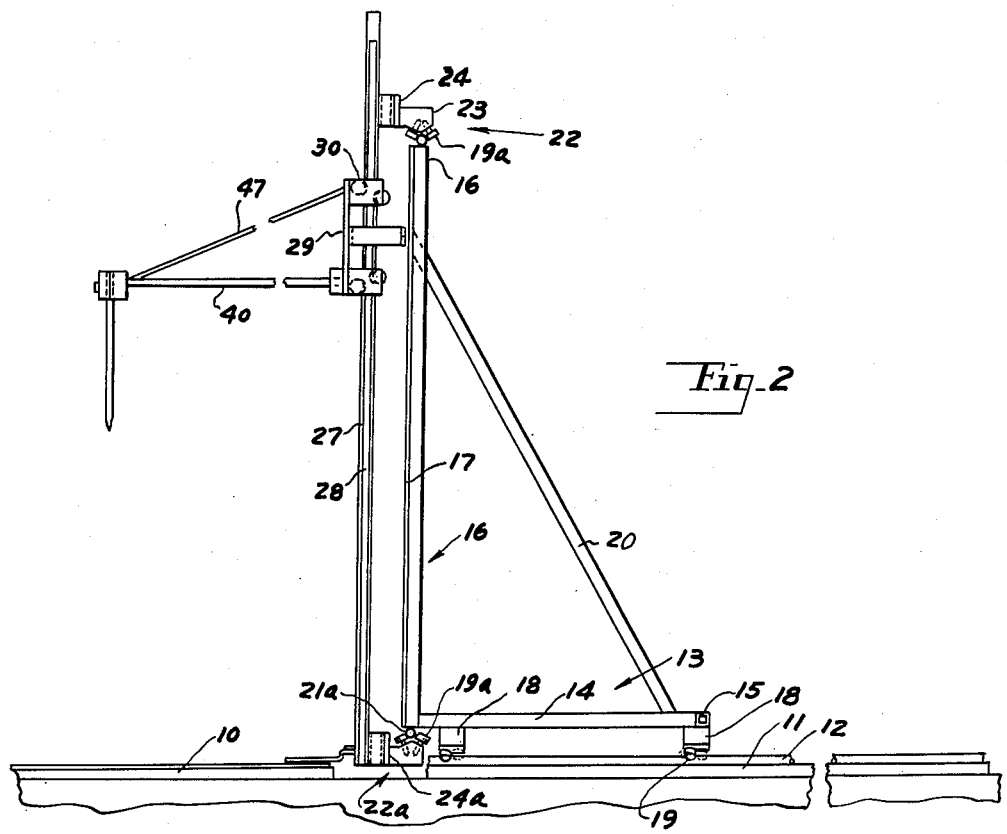
Fig. 2 is a side elevational view of the apparatus.
Figure 3:
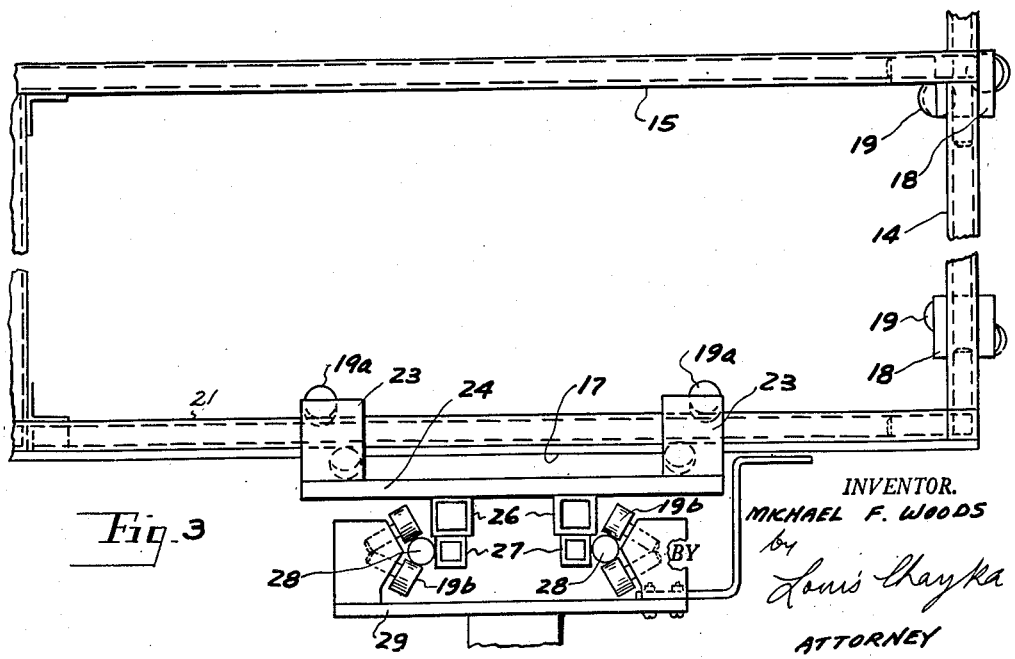
Fig. 3 is a fragmentary top elevational view thereof.

The apparatus includes a rectangular, flat base 10. Mounted upon each of its two opposite sides is a rail 11 which on top includes a longitudinal track-forming rod 12 to which I shall presently refer. Mounted on said rails for movement thereon is a rectangular carriage generally identified by numeral 13. The carriage consists of two side boards 14, disposed parallel to the respective sides of the base 10, and a transverse beam 15 forming the rear portion of the carriage, while the other or the front member of the carriage is formed by the lower side member of a rectangular, vertically-disposed frame generally identified by numeral 16. Each side bar 14 of the carriage is provided with two stub legs 18, each of which carries a pair of rollers 19. The rollers of each pair straddle the above-said longitudinal rod 12, the peripheral portions of the rollers bearing against said rod in a frictional contact therewith. The vertical frame 16 supports a flat drawing board 17, which for the purpose of holding it rigidly in its vertical position is propped from the back by a brace 20 extending from the upper portion of the board rearwardly to the rear portion of the carriage 13.

Mounted upon the top member of the frame 16, for movement therealong, is a trolley generally identified by numeral 22. The trolley is composed of two arms 23 disposed horizontally in a spaced relation to each other and joined together by a transverse plate 24 located forwardly of the board 17. Each of the arms carries, at its free end, a pair of rollers 19a, the rollers straddling a rod 21 secured to the top of frame 16 in a parallel relation thereto.

The lower side of the frame 16 is provided with a longitudinal track-forming rod 21a, and disposed beneath said rod is another trolley 22a of the same structure as the trolley 22, said trolley 22a including two arms and a plate joining them. However, as shown in Fig. 2, the trolley 22a is in a reverse or opposed position to the trolley at the top of the frame, the rollers of the trolley 22a bearing against the rod 21a from below.

As best shown in Fig. 1, the two trolleys, 22 and 22a, are joined to each other by a pair of vertical bars 27, each of which is secured, at the top, to plate 24 by means of an interposed spacer 26 and at its lower end also by means of a similar interposed spacer 26 to a plate 24a, the two bars being in a spaced, parallel relation to each other. Thus, the two trolleys and the bars form a unit or assembly adapted to be rolled upon the frame on said trolleys transversely to the length of said bars.

The vertical bars, each of which is provided on one side with a rod 28, form a track for movement of means for support of a marking guide to be used with reference to the vertical board 17. Said means include a rectangular plate 29 disposed parallel to the board 17, the plate being provided at each side with a pair of short arms 30 vertically alined and spaced from each other.

Each of the arms carries a pair of rollers straddling the respective rod 28 in the manner already described, in connection with the means supporting the vertical frame 16.

It will be noted that, as shown in Fig. 2, the rollers are mounted for rotation of short pins or axles which in each pair of the rollers are set at an angle to each other. This, however, is an optional feature.

Referring to said rollers generally, I wish to state that rollers of any other type, or single rollers with a grooved rim portion for engagement with the spacers 12, may be used in place of the pairs of rollers as shown in the drawings.

Secured to the plate 29 is a marking guide 31, this being a small device formed out of a strip of metal which at one end is connected to said plate and which at the other end includes a portion disposed parallel to the board 17 in a closely-spaced relation thereto, said portion being provided with a V-shaped notch 33. The V notch affords a space for reception and guidance of a marking implement, such as a pen, pencil, or any other object capable of leaving a mark on contact with paper or an equivalent object.

A similar guide 31a, supported by a bracket 34, is mounted on plate 24a beneath the frame 16, as shown in Fig. 1. A more detailed drawing of the bracket 34 is shown in Figs. 6 and 7. As shown in Fig. 7, which discloses the underside of the bracket and the guide 31a, said guide is provided with a slot 35. A screw 36, which is supported by the bracket, passes through said slot, while a knurled nut 37 bears against the guide from below, holding it in a frictional contact with the bracket. Numeral 38 indicates a washer between the nut and the bracket. The structure permits the guide to be shifted as desired, more or less forwardly of the board 17, and tightened against displacement by said nut.

Mounted upon the plate 29, by means of a block 39, is a horizontally-disposed arm 41 which extends forwardly from said plate beyond the front end of the base 10, the outer end of the rod serving to support clamp 41. The clamp, composed of two parts, is adapted to hold therebetween a vertically-disposed probing member or pointer 42, the two parts of the clamp, marked 43 and 44, respectively, being held together by screws 45. One of the members of the clamp, namely, member 43, as shown in Fig. 5, contains a bore for engagement with the rod 42, and is provided with a set screw 46 for engagement with said rod. For rigidity, rod 40 may be reinforced by a brace 47.

I shall now describe the manner in which the apparatus may be used.

Assuming that an object, such as object 50 shown in Fig. 1, is to be shown both in side elevation and in plan view, the apparatus has to be first placed on a stationary support so that the base 10 will be in a horizontal position. If the respective views of the object are to be shown on paper, a sheet of paper 48 has to be mounted on the vertical board 17 and another sheet, 49, has to be secured in place on the base 10. Next, the object 50 has to be placed on a horizontal stationary support which may be located forwardly of the base 10, preferably at the level thereof.

Next, the assembly mounted on the frame 16 for transverse rolling movement thereon, which assembly supports the plate 29, has to be moved along said frame till the vertically-disposed indicator 42 will be alined with a selected initial point on the object, such as point 52, from which point the projection is to be started. To this end, the plate 29, which supports the indicator 42 by means of the horizontal arm 40, has to be adjusted vertically till the end of the indicator 42 will be in contact with the object at said initial point.

In this case, as shown in Fig. 1, said point 52 is at the top of the object at the intersection of a vertical side wall and a vertical transverse wall of the object. With the indicator at said point, the marking guide 31, facing the vertical board 17, would be in position for indication of the initial point of the projection of the object in the vertical plane. The initial point can be marked manually by application of a pencil tip at the pointed end of the V notch in said guide. If desired, the marking guide can be substituted by a marking or line-producing device, such as a pen or pencil, permanently in operative contact with the surface of the paper or other medium on which the marks are to be made.

Starting at said initial point 52 on said object 50, the indicator can be guided manually along the top surface of the object and along the rim thereof at the intersection with a side surface. The movement of the pointer as so guided manually would be imparted, by means of said arm 40, to the whole movable assembly supporting said plate 29 and to the two marking guides or marking devices, as the case may be, so that the path of travel of the lower end or tip of the indicator would be traced by said marking devices in continuous lines or in a series of dots if made manually at consecutive stages of the movement of said marking guides.

A movement of the indicator 42 about the four sides of the object 50 would serve to produce, on the horizontally-disposed sheet of paper, a top elevational view of said object.

It will be obvious that any cavities, such as holes 55, or slots, such as slot 56, or other configurations of the object would be indicated in the manner described above in both planes, the vertical and the horizontal, by lines on the two sheets of paper. Thus, the projection of the side elevation of the object 50 would be displayed on the vertical surface, as shown by dots 53, while the projection of the object in a horizontal plane would be shown, as indicated by dots 54, on the sheet 49 on the base 10. The location of the holes or slots would be shown in the plan view of the object, while the depth of the holes or slots would be shown in the side elevational view of the object.

Now it will be assumed that it is desired to check an object as to whether its shape and its dimensions comply with the projections on the two sheets, the vertical one and the horizontal one, respectively. For this purpose, the object to be checked would be placed on a supporting member 51, and it would be the marks or lines made on the two sheets of paper, the one on the vertical board and the one on the base, which would have to be followed by the two marking guides or marking devices. The movement of the guides would be transmitted by intermediate means of the assembly to the vertical plate 29 and through the arm 40 to the pointer. As the marking guides would follow the lines or dots, such as dotted lines 53 and 54, the pointer would duplicate the path of the movement of the respective marking guides or other means used in substitution for said guides. In this manner the indicator would also check the locations of any cavities or depressions or indicate the areas where they were to be made.

It will be understood that the apparatus may be applied to other related uses and that some changes may be made in the structure of the apparatus without departing from the inventive concept disclosed herein.

What I, therefore, wish to claim is as follows:

1. An apparatus for drawing projections, the apparatus comprising a horizontal base, a vertical board mounted thereon for movement broadside over the base, an assembly mounted on the vertical board for a lateral movement thereon, a marking guide mounted on the assembly for use against the base, a member mounted upon the assembly for a vertical sliding movement thereon, a marking guide secured to said member for use against the vertical board, a horizontal arm extending from the member away from the board, and a pointer at the outer end of the arm for a probing contact with an object of which projections are to be made.

2. An apparatus for drawing projections, the apparatus comprising a rectangular, horizontal base, a vertical board mounted upon the base for movement thereon broadside in a direction parallel to two opposed sides of the base, an assembly mounted on the vertical board for a lateral movement thereon, the assembly including vertical bar means disposed in front of the vertical board, a marking guide mounted on said assembly for use with the base, a member mounted on the vertical bar means for vertical sliding movement thereon, a marking guide mounted on said member, a horizontal bar extending from the same member in the direction away from the vertical board, and a pointer at the outer end of the arm for a sliding contact with an object of which projections are to be made.

3. An apparatus for drawing projections, the apparatus comprising a rectangular, horizontal base, two straight track-forming rails on said base, the rails being in a spaced, parallel relation to each other, a trolley mounted for movement on said rails, a vertical board mounted on the trolley, an assembly mounted on the vertical board for a lateral movement thereon, the assembly including two vertical bars disposed in a spaced, parallel relation to each other in front of the board, transverse members joining said bars, arms extending therefrom to the boards for engagement therewith, a marking device supported by the assembly for use against the base, a vertical plate mounted on the two bars for a vertical sliding movement thereon, a marking device extending from the plate for use against the vertical board, an arm extending from the plate away from the board, and a pointer at the outer end of the arm for contact with the surface of the object of which projections are to be made.

4. An apparatus for drawing projections, the apparatus comprising a rectangular, horizontal base, two straight track-forming rails on said base, the rails being in a spaced, parallel relation to each other, a wheeled carriage mounted on said rails for a rolling movement thereon, a vertical board mounted on the carriage, the board being disposed in a plane transversely to the length of the rails, an assembly mounted on the vertical board for lateral movement thereon, the assembly including two vertical bars disposed in a spaced, parallel relation to each other in front of the board, transverse members joining the bars, arms extending therefrom towards the board, each of the arms being provided with rollers for engagement with said board, a marking device supported by the assembly for use against the base, a vertical plate mounted on the two bars for a vertical sliding movement thereon, a marking device extending from the plate for use against the vertical board, an arm extending from the plate away from the board, and a pointer at the outer end of the arm for contact with the surface of the object of which projections are to be made.

5. An apparatus for drawing projections, the apparatus comprising a rectangular, horizontal base, two straight track-forming rails on said base, the rails being in a spaced, parallel relation to each other, a wheeled carriage mounted on said rails for a rolling movement thereon, a vertical board mounted on the carriage, the board being disposed in a plane transversely to the length of the rails, an assembly mounted on the vertical board for lateral movement thereon, the assembly including two vertical bars disposed in a spaced, parallel relation to each other in front of the board, transverse members joining the bars, arms extending therefrom towards the board, each of the arms being provided with rollers for engagement with said board, a marking device supported by the assembly, the device including a flat V-notched strip in a parallel, close spacing to the base, a vertical plate mounted on the two bars for a vertical sliding movement thereon, a similar marking device extending from the plate, the device including a flat V-notched strip in a close, parallel spacing to the vertical board, an arm extending from the plate away from the board, and a pointer at the outer end of the arm for contact with the surface of the object of which projections are to be made.

No references cited.